(12) United States Patent
Thomas et al.

(10) Patent No.: US 6,688,987 B2
(45) Date of Patent: Feb. 10, 2004

(54) CONSTANT VELOCITY JOINT

(75) Inventors: Steven Mark Thomas, Saginaw, MI (US); Jennifer J. Lennon, Homer, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/354,702

(22) Filed: Jan. 30, 2003

(65) Prior Publication Data

US 2003/0144059 A1 Jul. 31, 2003

Related U.S. Application Data

(60) Provisional application No. 60/353,672, filed on Jan. 31, 2002.

(51) Int. Cl.[7] .............................................. F16D 3/224
(52) U.S. Cl. ........................................ 464/145; 464/906
(58) Field of Search ................................ 464/139–146, 464/906

(56) References Cited

U.S. PATENT DOCUMENTS

| | | | |
|---|---|---|---|
| 2,046,584 A | | 7/1936 | Rzeppa |
| 3,879,960 A | | 4/1975 | Welschof et al. |
| 4,698,047 A | * | 10/1987 | Welschof et al. ............ 464/145 |
| 5,509,856 A | | 4/1996 | Welschof |
| 5,782,696 A | * | 7/1998 | Guimbretiere .............. 464/145 |
| 6,186,899 B1 | * | 2/2001 | Thomas et al. ............. 464/145 |
| 6,431,988 B1 | * | 8/2002 | Tone .......................... 464/145 |

FOREIGN PATENT DOCUMENTS

EP    0802341 A1    10/1997

OTHER PUBLICATIONS

SAE Universal Joint and Driveshaft Design Manual, AE–7, Society of Automotive Engineers, Inc., Warrendale, PA, pp. 149 & 399, TJ1079.S62 1979.*
GKN Constant Velocity Product Catalog, GKN Automotive, Inc., Auburn Hills, MI, pp. 3 & 7, 1993.*

* cited by examiner

*Primary Examiner*—Greg Binda
(74) *Attorney, Agent, or Firm*—Michael D. Smith

(57) ABSTRACT

A constant velocity joint has outer and inner joint members formed with aligned ball grooves. A torque-transmitting ball is contained in each set of grooves and is captured within windows of a cage disposed between the joint members. The radial groove profile provides a large operating joint angle but with a relatively low $R_x$ ratio. At zero joint angle the balls are positioned in a ball center plane and define a ball center radius (BCR) in the ball center plane. As the joint angulates, the balls roll on the grooves and, while maintained in a ball plane, are displaced radially relative to the ball center radius (BCR). $R_x$=BCR/x, which is the ball displacement. The groove profile includes a straight section coupled with a double arc or polynomial curved section which attains high joint angle at a relatively low $R_x$ ratio.

11 Claims, 4 Drawing Sheets

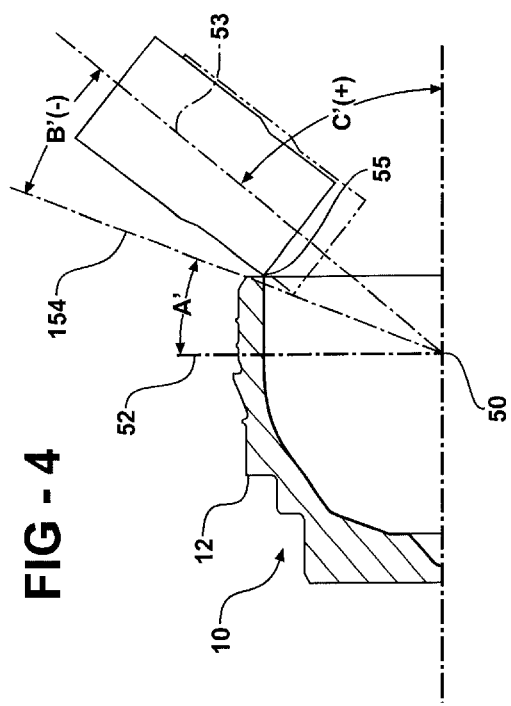
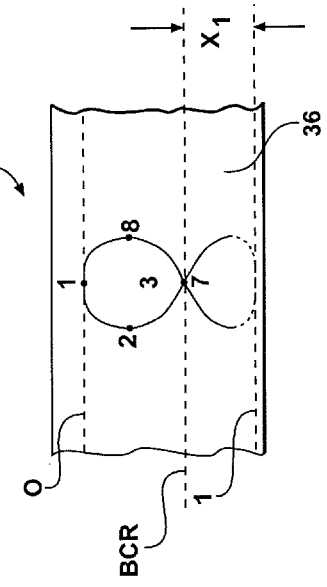
FIG - 3
PRIOR ART
FIG - 5
PRIOR ART
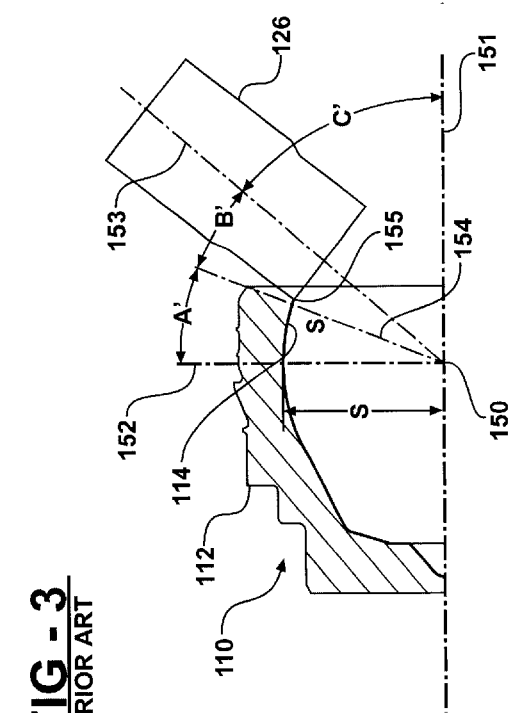
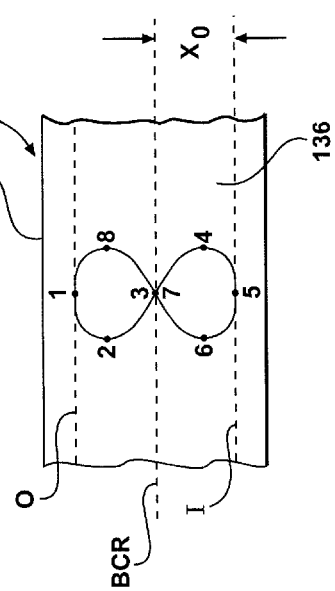
FIG - 4
FIG - 6

CONSTANT VELOCITY JOINT

The disclosure incorporates the constant velocity joint disclosed in U.S. provisional patent application No. 60/353,672, filed Jan. 31, 2002, whose priority is claimed for this application.

TECHNICAL FIELD

The technical field of this invention is constant velocity joints.

BACKGROUND OF THE INVENTION

A well known constant velocity joint, used in the drive axles of front wheel drive motor vehicles, is the "Rzeppa" joint, described in U.S. Pat. No. 2,046,584, in which a driving member and a driven member transmit torque through a plurality (generally 6) of balls captured in longitudinal grooves in the driving and driven member and a cage. The geometry of the arrangement ensures that the balls are always aligned in a plane which bisects the angle between a pair of planes normal to the driving and driven axes of rotation; and constant velocity rotation of the driven member is thus assured, regardless of the joint angle between driving and driven members. As the joint angle increases, however, some portion of the driven member, usually the output shaft, eventually abuts some portion of the driving member to define a maximum joint angle. A variety of design factors and constraints work together to limit this maximum joint angle, and considerable effort has been expended in attempting to increase it. Such increases in maximum joint angle have generally come at the cost of an increase in joint package size, which is not desirable in the crowded engine compartments of front drive vehicles.

A modification of the original "Rzeppa" design is shown in U.S. Pat. No. 3,879,960 to Welschof et al. The constant velocity joint of this design is undercut-free: that is, the grooves of the outer joint member have a radial profile at the open end which is parallel to the joint axis so that they are not undercut in the longitudinal direction. The undercut-free design of this reference provides a reasonably high maximum joint angle; but an even higher joint angle is desired.

Commonly owned U.S. Pat. No. 6,186,899 shows various constant velocity joint groove profiles which increase joint angle through a corresponding increase in the ratio ($R_x$) of the ball center radius (BCR) to the inward axial displacement (x) of the ball center relative to BCR, such that $R_x$=BCR/x=45 and greater at a joint angle of 46°. It is not always desirable to increase $R_x$ to the required range of 45 and above in order to achieve the higher joint angles.

SUMMARY OF THE INVENTION

The constant velocity joint of this invention provides an increase in maximum joint angle, relative to similarly constructed joints of the prior art, without a corresponding increase in joint package size. Thus, for any desired maximum joint angle, the constant velocity joint of this invention allows a smaller joint package size than a conventional "Rzeppa" joint of the prior art.

The constant velocity joint of this invention has a modified radial groove profile which significantly decreases ball movement radially inward of the ball center radius so that the ball cage may be increased in diameter without a corresponding increase in ball center radius. The radial groove profile provides a required predetermined funnel angle for ball control at the ball centered point of contact but minimal change in distance from the joint center over most of the axially inner side of the grooves in the outer joint member. One embodiment provides an undercut-free dual arc configuration of the ball grooves in which inner and middle arc segments are formed on the ball grooves of the outer joint member having centers of curvature which are axially offset to one side of the joint center and radially offset from one another and which transition into an undercut-free straight section at the open end of the joint. Another embodiment provides an undercut-free groove configuration in which a straight section of the outer joint ball grooves extends from the open end and transitions into a polynomial arc commencing at a transition point axially outward of the ball center plane at zero joint angle and extending inwardly toward an opposite closed end, and wherein the slope of curvature tangent to transition point is between 6 and 10°.

Both embodiments provide high angulation to the constant velocity joint without requiring an increase in package size of the outer joint member. In each case, the ratio $R_x$=BCR/x=30 to <45, at 46° joint angle, thus achieving high joint angle with a relatively low $R_x$ ratio as compared to the joints described in aforementioned U.S. Pat. No. 6,186,899.

BRIEF DESCRIPTION OF THE DRAWINGS

These and other features and advantages of the present invention will become more readily appreciated when considered in connection with the following detailed description and appended drawings, wherein:

FIG. 3 is a diagram illustrating a geometric constraint on joint angle in a constant velocity joint of the prior art;

FIG. 4 is a diagram illustrating, in comparison with the diagram of

FIG. 3, the larger geometrically constrained joint angle of an embodiment of a constant velocity joint according to this invention;

FIG. 5 illustrates radial movement of a ball within the ball cage of a constant velocity joint of the prior art;

FIG. 6 illustrates radial movement of a ball within the ball cage of an embodiment of a constant velocity joint according to this invention;

DETAILED DESCRIPTION

Figure 1:
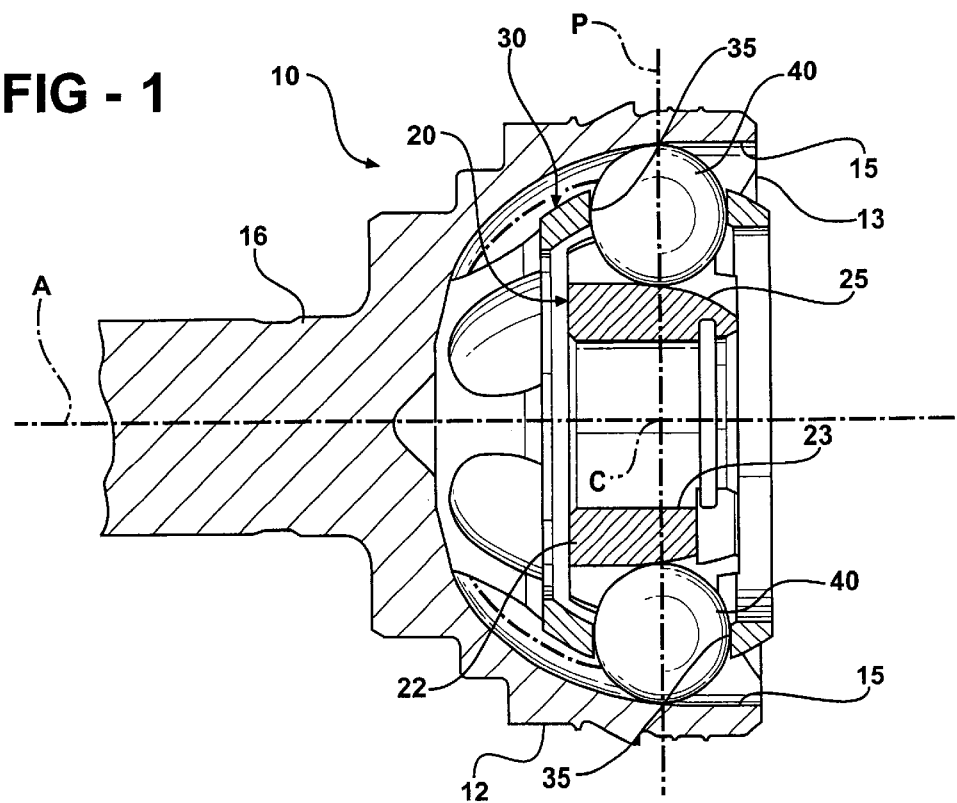
FIG. 1 is an axial section of a preferred embodiment of a constant velocity joint according to this invention, the section taken through a pair of opposing balls.
Figure 2:
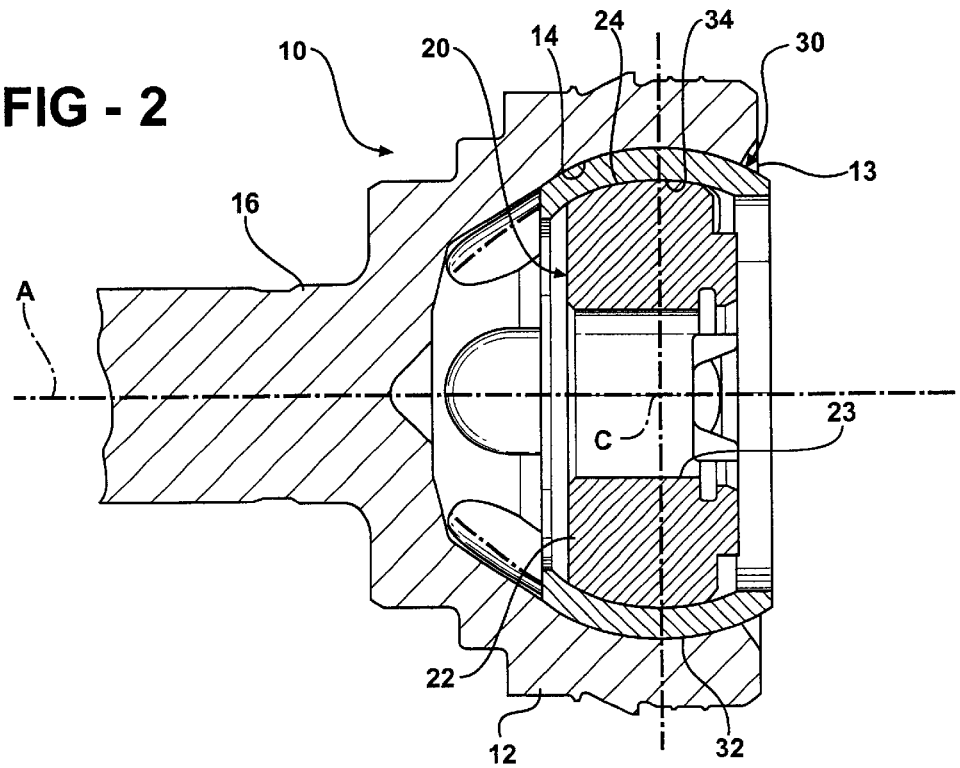
FIG. 2 is an axial section of the constant velocity joint of FIG. 1 which is rotated by 30 degrees relative to the section shown in FIG. 1.

The constant velocity joint of FIGS. 1 and 2 has an outer joint member generally indicated at 10 presenting an outer race 12 having an inner spherical surface 14 and an integral shaft 16 axially aligned with outer race 12. The joint further has an inner joint member generally indicated at 20 presenting an inner race 22 having an outer spherical surface 24 and adapted by opening 23 to receive an axially aligned shaft, not shown in FIGS. 1 and 2 but partially shown in FIG. 4, which projects in a direction generally opposite to that of shaft 16. In this embodiment, as in most such constant velocity joints, outer joint member 10 is the driven member and inner joint member 20 is the driving member; but the invention is not so limited. Each joint member 10, 20 has an axis, which are common along axis A when the joint members 10, 20 are at zero degree joint angle, as illustrated in FIGS. 1 and 2.

Inner spherical surface 14 of outer joint member 10 is formed with a plurality of circumferentially spaced longitudinal grooves 15, which extend axially from the open end 13 of outer race 12 in the direction of shaft 16. Grooves 15 are arranged in opposed pairs and equally spaced circumferentially around inner spherical surface 14. Likewise, outer spherical surface 24 of inner race 20 is broken by a plurality of longitudinal grooves 25, which extend axially thereacross. Grooves 25 are arranged in opposed pairs and equally spaced circumferentially around outer spherical surface 24. Grooves 15 and 25 will be further described below.

A cage 30 is provided between outer joint member 10 and inner joint member 20. Cage 30 has an outer spherical surface 32 which abuts inner spherical surface 14 of outer race 12 and further has an inner spherical surface 34 which abuts outer spherical surface 24 of inner race 22. The spherical surfaces of outer race 12, inner race 22 and cage 30 are all formed from centers which coincide in the assembled joint at a single point called the joint center C, shown in the drawings. Thus, outer race 12, inner race 22 and cage 30 therebetween are each free to rotate independently of the others, within limits, except as constrained by the balls to be described.

A plurality of cage windows 35, equal in number to the number of grooves 15 and grooves 25, are equally spaced circumferentially around cage 30. Cage windows 35 are preferably rectangular openings through cage 30 from outer spherical surface 32 to inner spherical surface 34 having opposing axially extending sides aligned in two parallel axial planes in the normal manner. Each cage window 35 retains a ball 40, which is also retained in one of grooves 15 of outer race 12 and in one of grooves 25 of inner race 22. The number of balls 40 is thus equal to the number of cage windows 35, grooves 15 and grooves 25: name six in this embodiment.

The arrangement described to this point is similar to a standard "Rzeppa" constant velocity joint and generally operates in the manner normal for such joints. In operation, balls 40 transmit torque between outer race 12 and inner race 22 to turn output shaft 16. When the joint angle is zero, with inner joint member 20 and outer joint member 10 (and thus input and output shafts) coaxial, cage 35 maintains balls 40 with the ball centers in a single plane P normal to the axis. When the joint angle becomes non-zero, grooves 15 become non-parallel with grooves 25 except in the plane of the joint angle. The position of each ball 40 is then determined by the crossing point of the particular one of grooves 15 and the particular one of grooves 25 which contains that ball; and the balls thus move back and forth in the grooves in a cycle synchronized with rotation of the joint. As each ball momentarily passes through the plane of the joint angle, the grooves momentarily become parallel, but the cage maintains the ball in the proper position. Provided that the grooves are correctly designed, the balls are thus automatically maintained at all times with their centers in a plane that bisects the angle between planes normal to the outer member and the inner member. The constant velocity joint of this invention differs from that of other "Rzeppa" joints in providing a new profile of the grooves 15 and 25 which allows cage 35 to be made radially larger without increasing the ball center radius (BCR). The result is a greater maximum joint angle with substantially no increase in the package size of the joint.

The main limitation on maximum joint angle can be seen in FIG. 3, which represents a standard "Rzeppa" joint of the prior art. Only one half outer race 112 of outer joint member 110 is shown; and only an attached shaft 126 of a corresponding inner race is shown. All other parts are removed for simplicity, but they are understood to be present and operable as described above to determine the relative positions of the parts shown. In FIG. 3, the joint center 150 is shown as the intersection of four lines: the joint axis 151 (which is also the axis of outer joint member 10), normal line 152 (which is perpendicular to joint axis 151 in the plane of the joint angle: the plane of FIG. 3), the axis 153 of shaft 126, which is also the axis of the attached inner race and thus defines the joint angle with joint axis 151, and a line 154 from joint center 151 through point 155. Point 155 is the first point of contact between shaft 126 being rotated counter-clockwise in FIG. 3 and outer race 112 and thus defines the maximum joint angle. Point 155 is located at the outer (right) edge of inner spherical surface 114.

The maximum joint angle is shown in FIG. 3 as angle C'. In order for this angle to increase, the sum of angles A' and B' must decrease. But angle A' represents the amount of spherical "wrap-around" which is required to retain the cage within outer race 112. Assuming the joint is optimally designed, this angle cannot be decreased without decreasing this retention capability below its design value. Thus, in order for angle C' to increase, angle B must decrease. But, again assuming optimal joint design, angle B' cannot be decreased by reducing radius of shaft 126 without reducing the strength of shaft 126 below its design value.

Angle B' can be reduced, however by increasing radius "S" of inner spherical surface 114. FIG. 4 shows a joint corresponding to that of FIGS. 1 and 2, with a new, larger radius, which results in a new inner spherical surface 14. The amount of increase is also exaggerated in FIG. 4 for demonstration purposes, and is not to be considered in scale. The new point of contact 55 between shaft 26 and outer race 12 is still on the original line 154 (angle A' relative to normal line 52 has not changed). But because the radius of shaft 26 subtends a smaller arc at the larger distance from joint center 50, the former axis 153 of shaft 126 has now moved counter-clockwise to become the new axis 53 of shaft 26. Former angle B' has decreased B'(−), and joint angle C'(+), has increased. An increase on the order of about 3 degrees is attainable over standard Rzeppa joints: for example, from 47 to 50 degrees in an undercut-free joint.

With spherical surface 14 at a greater distance from the joint axis, cage 30 and spherical surface 24 are also enlarged radially by essentially similar distances. But the ball center radius (BCR), which is the distance from the joint center to the centers of the balls at zero joint angle, is not significantly changed. Thus, it is possible to avoid increasing the joint package size. It is necessary, however, to provide new profiles for grooves 15 and 25 to create a different ball movement within cage windows 35 consistent with constant velocity rotation of the joint.

When the joint angle is non-zero, balls 40 move in and out radially relative to the joint center as they move back and forth along the grooves. This is due to the groove geometry: in particular, the fact that the grooves are constructed relative to a center of rotation offset from the joint center. The balls pass through the ball center radius twice during each rotation of the joint as they move outward beyond the ball center radius and inward within the ball center radius. Since cage 30 moves with a constant radius centered on the joint center C, the balls move radially inward and outward relative to cage 30. The movement can be pictured in a prior art joint in FIG. 5 as the movement of a spot contact of a ball on an inner surface 136 of a window 135 in cage 130. With the extreme point of ball movement in the groove toward the open end of outer race 112 labeled O, the centered position labeled "BCR" and the extreme point of ball movement in the groove toward the closed end of outer race 112 labeled I, the movement describes generally a figure eight pattern on the cage window surface. This pattern at least partially determines the dimensions of the cage, since cage 130 must retain the balls at all times. It can be seen that, if cage 130 is moved significantly outward with an increase in its radius without changing the ball center radius, the ball movement of the prior art grooves can move the contact point completely off the cage at the inner end of ball travel along the groove at large joint angles; and this is an undesirable result. As previously mentioned, if the ball center radius is increased along with the cage radius, this causes the entire joint package to increase in size; and this is not a preferred result.

The groove geometry of the joint of this invention allows an increase in cage radius without a significant corresponding increase in the ball center radius by changing the groove geometry to reduce the radial movement of the balls below the ball center radius while increasing it above the ball center radius. This is demonstrated in FIG. 6, which shows cage 30 moved upward (radially outward) relative to the ball center radius. The distance between the ball center radius and the radially innermost point I is seen to be reduced from $X_0$ to $X_1$ so that the contact point remains on cage window inner surface 36 through an entire rotation of the joint. This enables the cage to be radially enlarged without correspondingly enlarging the ball center radius, and thus joint package size; and the larger cage permits a greater joint angle. This change can be expressed as an increase in the ratio $R_x$=BCR/X, where BCR is the ball center radius of the joint at a joint angle of zero and X is the maximum travel of the ball centers below the ball center radius at a joint angle of 46 degrees. Typical values of $R_x$ for joints of the prior art are in a range around 18. Values achieved in this invention exceed 30 but are less than 45.

Figure 7:
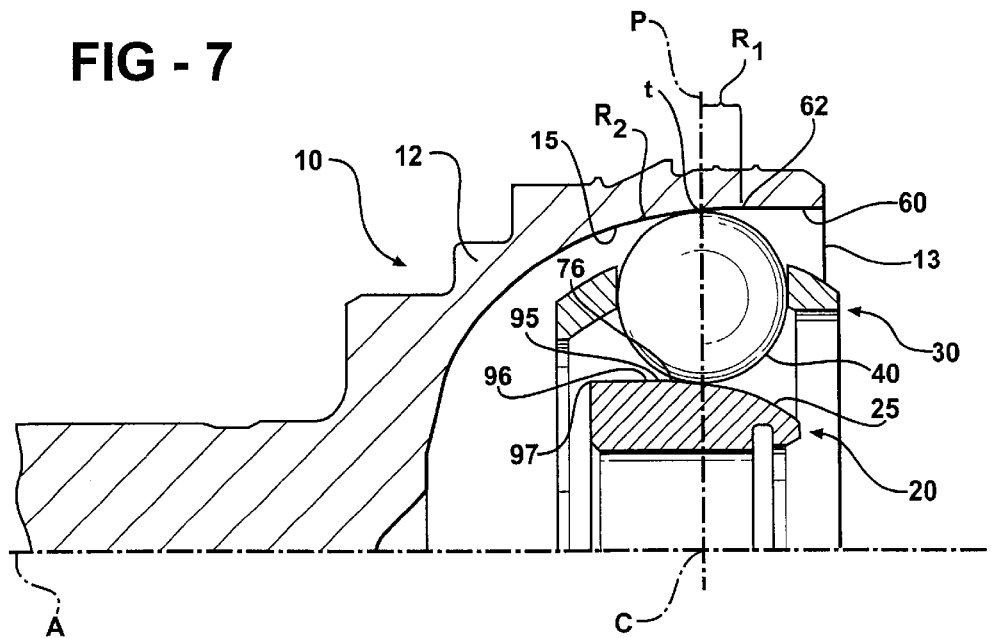
FIG. 7 illustrates the radial profile of ball grooves in the outer and inner joint members.
Figure 8:
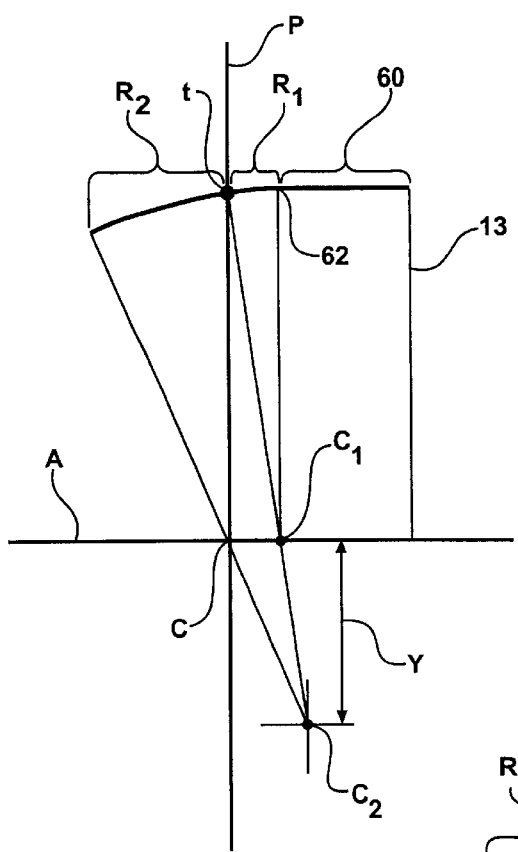
FIG. 8 is a trace of the outer joint ball groove profile.

The groove geometry that produces the beneficial ball movement shown in FIG. 6 is described with reference to FIGS. 7 and 8. FIG. 7 shows the ball 40 in the centered position in an undercut joint constructed according to a first embodiment of the invention, with the outer and inner joint members 10, 20 at a zero degree angle. FIG. 7 illustrates the radial groove profiles of the outer and inner joint members 10, 20 that cooperate to generate the ball movement of FIG. 6, producing high joint angle with relatively low $R_x$ ratio. The groove profiles of the outer and inner joint members 10, 20 are essentially the same, but oppositely arranged to provide the desired funnel angle of the grooves. FIG. 8 shows further details of the groove profile of the outer joint 10, with it being understood that the details are equally applicable to the grooves of the inner joint 20, but oppositely arranged as shown in FIG. 7.

The profile of the grooves 15 of the outer joint 10 includes an undercut-free straight section 60, which is parallel to the longitudinal axis A of the outer joint member 10 and extending from the open end 13 inwardly to a juncture point 62 spaced axially outwardly of the center plane P as shown in FIGS. 7 and 8. The groove profile further includes two arcuate sections $R_1$ and $R_2$ which have different centers of radii, as will be described below with reference to FIG. 8, and which are tangent at a point t lying in the plane P. The intersection of the plane P and axis A defines a center point C of the joint which remains the same at all angles of joint members 10, 20.

Turning now in more detail to FIG. 8, the groove profile of the outer joint 10 is shown in relation to the center plane P and axis A, including the straight section 60 and arcuate sections $R_1$ and $R_2$. The first arcuate section $R_1$ is centered at point $C_1$ lying on the longitudinal axis A and is offset axially outwardly from the center point C of the joint toward the open end 13. The first arcuate section $R_1$ is tangent with the straight section 60 at point 62 at the same distance outwardly from the center plane P as the offset between $C_1$ and C.

The second arcuate section $R_2$ extends inwardly from the first arcuate section $R_1$ at tangent point t and is larger in radius than that of $R_1$. $R_2$ is centered at point $C_2$ at a location spaced a predetermined distance y below the axis A of the outer joint 10 and offset axially toward the open end 13 by a distance greater than that between $C_1$ and C. The vertical distance y can be adjusted by changing the radius of $R_2$ in order to change the $X_1$ value of FIG. 6 and thus the $R_x$ ratio to achieve, at a joint angle of 46°, an $R_x$ value of between 30 and <45.

Figure 9:
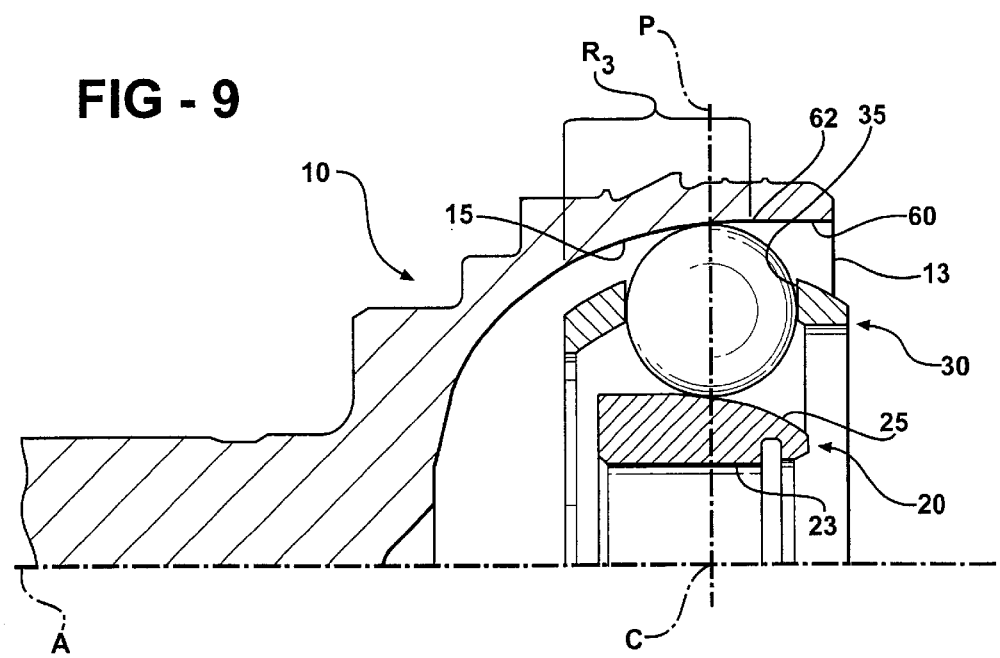
FIG. 9 is an axial section of an alternative embodiment of the constant velocity joint of this invention.
Figure 10:
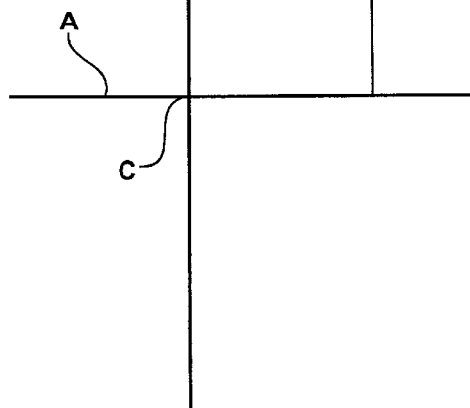
FIG. 10 is a trace of the outer joint ball groove profile of the alternative embodiment.

A similar result is obtained according to the alternative groove profile illustrated in FIGS. 9 and 10 pursuant to a second alternative embodiment of the invention. The same reference numerals are used where appropriate to indicate corresponding features with that of the first invention. The groove profile may include a straight section 60 that is parallel to the axis A and extends between the open end 13 and a transition point 62 spaced axially outwardly from the center plane P of the joint when the joint members 10, 20 are at zero angle. The groove profile transitions at point 62 into an arcuate section $R_3$ which is defined by a polynomial such that the following constraints are met: first, the horizontal section 60 must intersect the curve of $R_3$ at point 62, the slope of tangency of the curve $R_3$ at the point g lying in the plane P must be set at an angle α of between 6 to 10° relative to the horizontal axis A. Such a profile of the ball grooves (the profile of the inner balls grooves being equal but opposite) yields a $R_x$ ratio of greater than 30 but less than 45 measured at a joint angle of 46°. The slope of the polynomial at the open end of the joint (outer race) is about 0–25° relative to horizontal axis A. Accordingly, the second embodiment groove profile, like the first embodiment groove profile, yields a relatively high joint angle of up to 50° but with a correspondingly low $R_x$ ratio, and may also be applicable to lower joint angles. The polynomial groove profile for high angle joint applications (i.e., those where the joint angle is about 50°) may be represented by the polynomial equation, High angle $Y=0.0002x^3-0.0092x^2+0.1053x+27$. The groove profile for lower angle joint (about 47°) may be represented by the polynomial equation Low angle $Y=-0.0002x^3+0.0132x^2+0.1092x+27$.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A constant velocity joint comprising:

an outer joint member having an open end and a longitudinal axis;

an inner joint member disposed in said outer joint member for relative angular movement;

a plurality of circumferentially spaced aligned ball grooves formed in said inner and outer joint members;

a plurality of torque-transmitting balls one each disposed in each of said aligned ball grooves of said inner and outer joint members;

a cage disposed between said inner and outer joint members and having a plurality of windows in each of which is received an associated one of said plurality of said balls, said grooves and said windows restraining movement of said balls to maintain said balls in a common ball plane passing through said axis of said outer joint member and defining a centerpoint of angulation of said outer and inner joint members, said balls defining ball centered positions at a ball center radius from a joint axis when said outer and inner joint members are at a zero joint angle and said grooves defining ball centered points of contact with each associated ball therein when said associated ball therein is in said ball centered position; and said ball grooves of said outer joint member having a radial profile including an undercut-free straight section adjacent said open end of said outer joint member and at least one arcuate section extending longitudinally inwardly of and tangent with said straight section and providing a ratio of said ball centered radius to a maximum ball movement of said balls radially inwardly from said ball center radius of at least 30 and less than 45 at a joint angle of 46 degrees.

2. The constant velocity joint of claim 1 wherein said at least one arcuate section of said radial profile includes a first arcuate section tangent to said straight section and having a radial center lying on said longitudinal axis of said outer joint member and offset axially from said center point of said joint.

3. The constant velocity joint of claim 2 wherein said at least one arcuate section includes a second arcuate section having a radial center spaced radially from said radial center of said first arcuate section.

4. The constant velocity joint of claim 3 wherein said radial center of said second arcuate section is spaced axially from said center point of said joint.

5. The constant velocity joint of claim 4 wherein said radial center of said second arcuate section is spaced axially from said radial center of said first arcuate section.

6. The constant velocity joint of claim 5 wherein said section arcuate section is tangent to said first arcuate section at a point lying in said ball plane when said outer and inner joint members are said zero degree joint angle.

7. The constant velocity joint of claim 3 wherein said second arcuate section has a radius that is relatively larger than a radius of said first arcuate section.

8. The constant velocity joint of claim 1 wherein said grooves of said inner joint member having a corresponding groove profile as that of said grooves of said outer joint member, but axially reversed.

9. The constant velocity joint of claim 1 wherein said at least one arcuate section comprises a single arcuate section defined by a polynomial curve tangent to said straight section and having a slope at a point lying in said ball plane at said zero joint angle of between 6 and 10 degrees.

10. A constant velocity joint comprising:

an outer joint member having an open end and a longitudinal axis;

an inner joint member disposed in said outer joint member for relative angular movement;

a plurality of circumferentially spaced aligned ball grooves formed in said inner and outer joint members;

a plurality of torque-transmitting balls one each disposed in each of said aligned ball grooves of said inner and outer joint members;

a cage disposed between said inner and outer joint members and having a plurality of windows in each of which is received an associated one of said plurality of said balls, said grooves and said windows restraining movement of said balls to maintain said balls in a common ball plane passing through said axis of said outer joint member and defining a centerpoint of angulation of said outer and inner joint members, said balls defining ball centered positions at a ball center radius from a joint axis when said outer and inner joint members are at a zero joint angle and said grooves defining ball centered points of contact with each associated ball therein when said associated ball therein is in said ball centered position; and said ball grooves of said outer joint member having a radial profile including at least one arcuate section defined by a polynomial curve having a slope at a point lying in said ball plane at said zero joint angle of between 6 and 10 degrees and providing a ratio of said ball centered radius to a maximum ball movement of said balls radially inwardly from said ball center radius of at least 30 at a joint angle of 46 degrees.

11. A constant velocity joint comprising:

an outer joint member having an open end and a longitudinal axis;

an inner joint member disposed in said outer joint member for relative angular movement;

a plurality of circumferentially spaced aligned ball grooves formed in said inner and outer joint members;

a plurality of torque-transmitting balls one each disposed in each of said aligned ball grooves of said inner and outer joint members;

a cage disposed between said inner and outer joint members and having a plurality of windows in each of which is received an associated one of said plurality of said balls, said grooves and said windows restraining movement of said balls to maintain said balls in a common ball plane passing through said axis of said outer joint member and defining a centerpoint of angulation of said outer and inner joint members, said balls defining ball centered positions at a ball center radius from a joint axis when said outer and inner joint members are at a zero joint angle and said grooves defining ball centered points of contact with each associated ball therein when said associated ball therein is in said ball centered position; and said ball grooves of said outer joint member having a radial profile including a first arcuate section having a radial center lying on said longitudinal axis of said outer joint member and offset axially from said center point of said joint, and a second arcuate section having a radial center spaced radially from said radial center of said first arcuate section and providing a ratio of said ball centered radius to a maximum ball movement of said balls radially inwardly from said ball center radius of at least 30 at a joint angle of 46 degrees.

* * * * *